United States Patent
Cerda

(10) Patent No.: US 10,484,742 B2
(45) Date of Patent: Nov. 19, 2019

(54) METHOD AND SYSTEM FOR PROVIDING INFORMATION TO A USER VIA A PROJECTION DEVICE

(71) Applicant: Umbo, Inc., San Francisco, CA (US)

(72) Inventor: Francisco Saez Cerda, San Francisco, CA (US)

( * ) Notice: Subject to any disclaimer, the term of this patent is extended or adjusted under 35 U.S.C. 154(b) by 0 days.

(21) Appl. No.: 15/458,951

(22) Filed: Mar. 14, 2017

(65) Prior Publication Data
US 2018/0063587 A1    Mar. 1, 2018

Related U.S. Application Data

(60) Provisional application No. 62/366,833, filed on Jul. 26, 2016.

(51) Int. Cl.
*H04N 21/478* (2011.01)
*H04N 21/442* (2011.01)
(Continued)

(52) U.S. Cl.
CPC ......... *H04N 21/478* (2013.01); *H04N 9/3179* (2013.01); *H04N 9/3194* (2013.01); *H04N 21/25891* (2013.01); *H04N 21/4122* (2013.01); *H04N 21/42202* (2013.01); *H04N 21/4436* (2013.01); *H04N 21/44218* (2013.01); *H04N 21/44222* (2013.01); *H04N 21/4532* (2013.01);
(Continued)

(58) Field of Classification Search
CPC ......... H04N 21/44218; H04N 21/4532; H04N 21/44222; H04N 21/4436; H04N 21/478; H04N 21/4122; H04N 21/4126; H04N 21/23; H04N 21/458; H04N 21/251; H04N 21/4622; H04N 21/252; H04N 21/25891; H04N 21/4882; H04L 12/2803; H04L 12/2816; H04L 12/2809; H04L 12/2823; H04L 12/282; H04L 67/22; H04L 67/306; H04L 67/30; H02J 2003/143; G06F 17/3087; G06F 2221/2111; G06F 3/017; G06F 17/30029; G06F 17/30867; G06F 3/04817; G06F 3/04842; G06F 9/451; G06F 3/04886; G06F 9/4451; H04W 4/02; G06Q 10/109
USPC ............................................. 725/12; 715/811
See application file for complete search history.

(56) References Cited

U.S. PATENT DOCUMENTS 5,966,696 A * 10/1999 Giraud .................. G06Q 30/02
                                                              235/379
6,431,766 B1 * 8/2002 Randle .................. G02B 6/423
                                                              385/92

(Continued)

*Primary Examiner* — Cynthia M Fogg
(74) *Attorney, Agent, or Firm* — Eldredge Law Firm; Richard Eldredge

(57) ABSTRACT

A method and system for providing information to a user are provided. The method includes detecting a trigger based on at least one of signals received from a motion sensor indicating presence of the user within proximity of the motion sensor, wherein the motion sensor is located in proximity to a projection device, and determining a preconfigured time. The method also includes identifying information for providing to the user based on the trigger and stored user preferences. Further, the method includes providing information to the projection device in communication with the server for projecting information on a view space in proximity to the projection device.

17 Claims, 14 Drawing Sheets

(51) Int. Cl.
  *H04N 21/41*   (2011.01)
  *H04N 21/443*  (2011.01)
  *H04N 9/31*    (2006.01)
  *H04N 21/45*   (2011.01)
  *H04N 21/258*  (2011.01)
  *H04N 21/422*  (2011.01)

(52) U.S. Cl.
  CPC ......... *H04N 9/3155* (2013.01); *H04N 9/3185* (2013.01)

(56) References Cited

U.S. PATENT DOCUMENTS

| | | | |
|---|---|---|---|
| 7,290,885 B2 | 11/2007 | Salvatori et al. | |
| 8,016,421 B2 | 9/2011 | Eberl et al. | |
| 9,589,431 B2 | 3/2017 | Wingate et al. | |
| 2001/0008485 A1* | 7/2001 | Fuji | H01J 61/34 362/294 |
| 2007/0205875 A1 | 9/2007 | Chen | |
| 2008/0092173 A1* | 4/2008 | Shannon | H04N 5/44543 725/47 |
| 2008/0122991 A1 | 5/2008 | De Haan | |
| 2010/0039823 A1* | 2/2010 | Sun | H01J 61/045 362/296.08 |
| 2011/0069940 A1* | 3/2011 | Shimy | G11B 27/105 386/296 |
| 2011/0134300 A1* | 6/2011 | Chung | H04M 1/0254 348/333.01 |
| 2011/0154233 A1 | 6/2011 | LaMarca et al. | |
| 2014/0075385 A1* | 3/2014 | Wan | G06Q 10/1093 715/812 |
| 2015/0189356 A1* | 7/2015 | Shen | H04N 21/4126 725/34 |
| 2016/0100696 A1* | 4/2016 | Palashewski | A47C 31/00 700/90 |
| 2016/0148487 A1* | 5/2016 | Thomas | G08B 21/22 340/686.6 |
| 2016/0241823 A1* | 8/2016 | Blaser, Jr. | H04N 9/3144 |
| 2016/0344987 A1* | 11/2016 | Taherloo | G03B 21/10 |

* cited by examiner

METHOD AND SYSTEM FOR PROVIDING INFORMATION TO A USER VIA A PROJECTION DEVICE

TECHNICAL FIELD

The present disclosure relates to a method and a system for providing information to a user via a projection device.

BACKGROUND

People, typically, require different types of information on various days and at different times of a day. For example, in a home environment, a user may be interested in knowing a work schedule for a day, traffic conditions along a route to a workplace, and a weather forecast in the beginning of the day. However, when the user returns to the home environment in the evening, the user may be interested in knowing upcoming television shows or news updates. Further, the type of information required by the user depends on a current location of the user. For example, in a bedroom of the home environment, the user may be interested in knowing a work schedule for the next day, whereas in a kitchen the user may be interested in knowing grocery items pending for purchase.

Typically, to procure the aforesaid information, the user may need to access various information sources. For example, to know the work schedule for the day, the user may need to look up a work diary placed in a drawer of a study room. Similarly to know the upcoming news updates, the user may need to turn on a television and browse a plurality of television channels before arriving at a relevant news channel to view the desired news updates. Procuring the information from the plurality of information sources may usually consume unwarranted time of the user. Further, the user may need to memorize availability and content of the plurality of information sources. For example, the user may need to memorize which drawer the work diary is lying in, and the type of information present in the work diary. Such a requirement of memorizing information sources is usually burdensome to the user especially when the requirement for the information and the plurality of information sources is huge.

In view of the above, there is a need to provide desired information to the user in a convenient and timely manner.

SUMMARY

Various embodiments of the present disclosure provide systems and methods for providing information to a user.

The method includes detecting a trigger based on at least one of signals received from a motion sensor indicating presence of the user within proximity of the motion sensor, wherein the motion sensor is located in proximity to a projection device, and determining a preconfigured time. The method also includes identifying information for providing to the user based on the trigger and stored user preferences. Further, the method includes providing information to the projection device in communication with the server for projecting information on a view space in proximity to the projection device.

A projection system includes a motion sensor. The projection system also includes a processor configured to receive signals from the motion sensor, detect presence of a user in proximity to the motion sensor, and identify information for providing to the user based on stored user preferences. Further, the projection system includes a projection device configured to receive the information, and project the information on a view space in proximity to the projection device.

A system includes a processor. The system also includes a memory coupled to the processor. The memory stores instructions which when executed by the processor cause the system to perform a method for providing information to a user. The method includes detecting a trigger based on at least one of signals received from a motion sensor indicating presence of the user within proximity of the motion sensor, wherein the motion sensor is located in proximity to a projection device, and determining a preconfigured time. The method also includes identifying information for providing to the user based on the trigger and stored user preferences. Further, the method includes providing information to the projection device in communication with the server for projecting information on a view space in proximity to the projection device.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Figure 1:
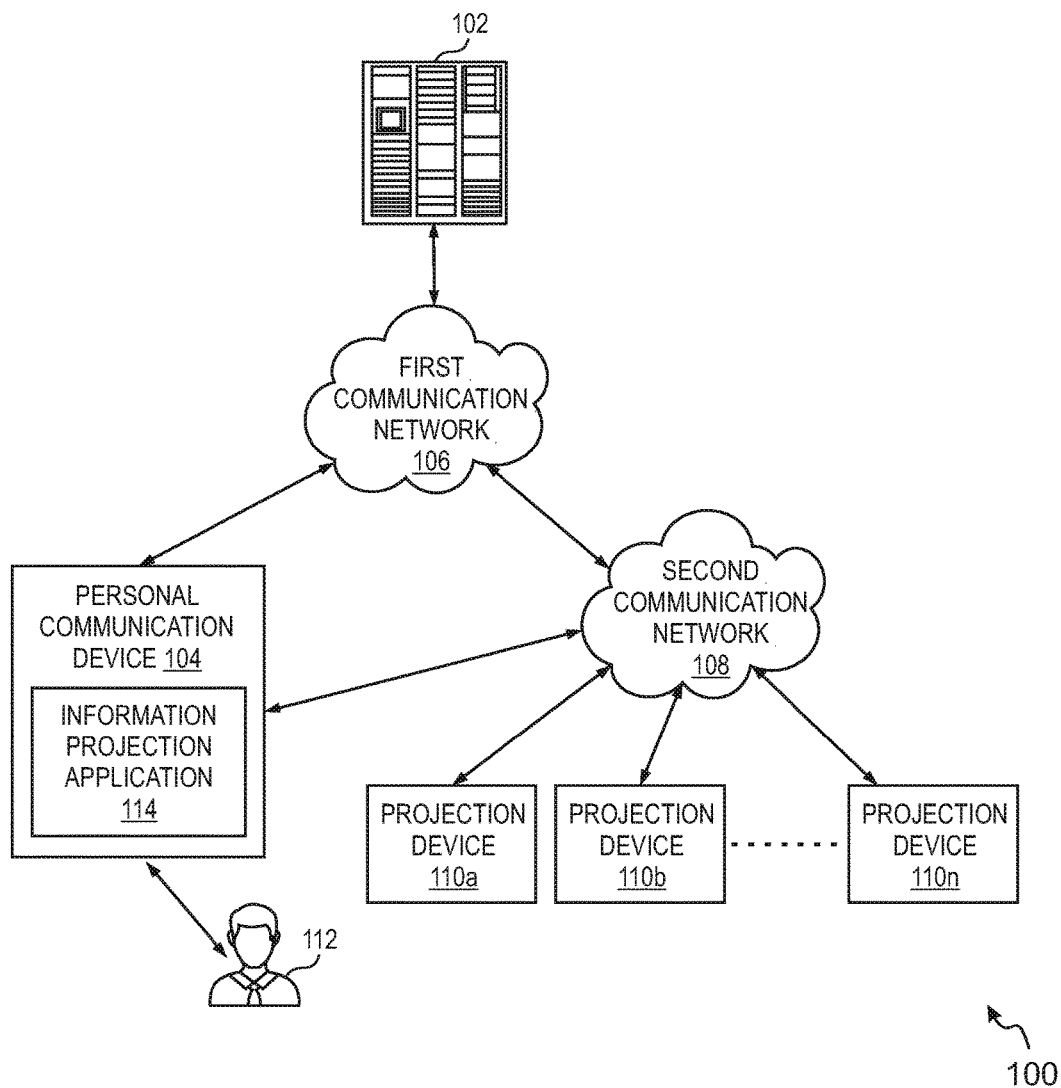
FIG. 1 is a block diagram of a system configured to provide information to a user, in accordance with an example embodiment of the invention.

Referring now to FIG. 1, a system 100 to facilitate projection of information to a user 112 is shown in accordance with an example embodiment.

The system 100 includes a server 102, a plurality of projection devices 110a-n, and a personal communication device (PCD) 104 associated with the user 112.

In one embodiment, the server 102 and one or more projection devices in communication with each other and with the server 102 are referred to as a projection system. The projection devices including the sensors are referred to as one or more single devices. One single device includes one projection device and one or more sensors.

In an example embodiment, the server 102 is communicably coupled with the PCD 104 directly via a first communication network 106. Examples of the first communication network 106 may include the Internet, a wide-area network, a local-area network, a client-server network such as a cloud-computing network, or other such network. In some example embodiments, the PCD 104 may be communicably associated with the first communication network 106 via a second communication network 108. The second communication network 108 may include low energy communication networks that operate over a short range, for example 0-20 feet. Examples of the second communication network 108 may include Bluetooth® network, a Wi-Fi network, and the like. The PCD 104 may be installed with an information projection application 114 using which the user 112 may communicate with the server 102 for setting and modifying stored user preferences.

Further, the server 102 is communicably coupled with the plurality of projection devices 110a-n via the first communication network 106 and the second communication network 108. The plurality of projection devices 110a-n may be deployed at a plurality of predefined locations within an indoor environment. In an example embodiment, the indoor environment may be a home environment and the plurality of projection devices 110a-n may be placed in various rooms such as bedroom, kitchen, hall, study room, and other rooms available within the home environment. In another example embodiment, the system 100 may be deployed in a larger indoor environment, such as a hotel, and the plurality of projection devices 110a-n may be placed in various guest rooms of the hotel. Each projection device such as projection device 110a may be preferably positioned within a predefined location of the indoor environment, so as to provide the information to the user 112 in an unobstructed manner.

Further, the plurality of projection devices 110a-n may communicate with the PCD 104 via the second communication network 108. In an example embodiment, the plurality of projection devices 110a-n may communicate with the PCD 104 via Bluetooth® communications, preferably Bluetooth® Low Energy (BLE) communications. The PCD 104 is depicted to be a mobile phone, however the PCD 104 may be any electronic device such as a laptop, a tablet computer, a smartphone, a wearable device, a multimedia player, a personal digital assistant (PDA) and such handheld communication devices capable of being carried by the user 112 while navigating the indoor environment. It is noted that the plurality of projection devices 110a-n may be configured to provide information to the user 112 irrespective of whether the user 112 is carrying the PCD 104 or not. For example, the plurality of projection devices 110a-n may sense the presence of the user 112 in a location (for example, by using a camera and computer vision algorithms) and thereafter provide information to the user 112 based on user preferences stored in the server 102.

In an example scenario, the user 112 may need a variety of information on various days and at different times of a day. Further, the user 112 may need to procure various types of information from a plurality of information sources depending on an accessibility of an information source and a type of information needed. For example, the user 112 may be interested in knowing a work schedule for a day, traffic conditions along a route to a workplace, and a weather forecast of the day in a beginning of the day such as early morning when the user 112 wakes up.

Various embodiments of the present technology provide such plurality of information to the user at desired time. More specifically, the server 102 tracks a location of the user 112 in the indoor environment using the plurality of projection devices 110a-n, and provides information to the user 112 based on the tracked location of the user within the indoor environment and stored user preferences. The projection device 110A includes a motion sensor that detects motion of the user 112 and indicates presence of the user 112 in proximity to the projection device 110A. The user preferences may be received from the user 112 at time of setting or configuring the information projection application 114 on the PCD 104. The server 102 receives signals from the projection device 110A indicating the presence of the user 112 in proximity to the projection device 110A and detects a trigger. In another embodiment, the trigger may be detected based on a preconfigured time. For example, the user 112 may schedule a wake-up call at a preconfigured time and may want to see weather information or day's schedule. The server 102 identifies the information for providing to the user 112 by checking stored user settings/preferences and fetching corresponding information.

The information is then provided to the user 112 via the projection device 110A in the tracked location at a particular time and day. For example, when the user 112 wakes up in the morning and the tracked location is a particular room of a hotel, the information preferred by the user 112 may include a menu for breakfast, a weather forecast and such other information. A plurality of user preferences including a plurality of information required by the user 112 at predefined locations and predetermined time periods may be stored in the server 102. The plurality of user preferences may be accessed by the server 102 for determining the information to be provided to the user 112 upon receiving the tracked location of the user 112 from the plurality of projection devices 110a-n. The determination of the information to be provided to the user 112, by the server 102, is explained in further detail with reference to FIG. 2.

Figure 2:
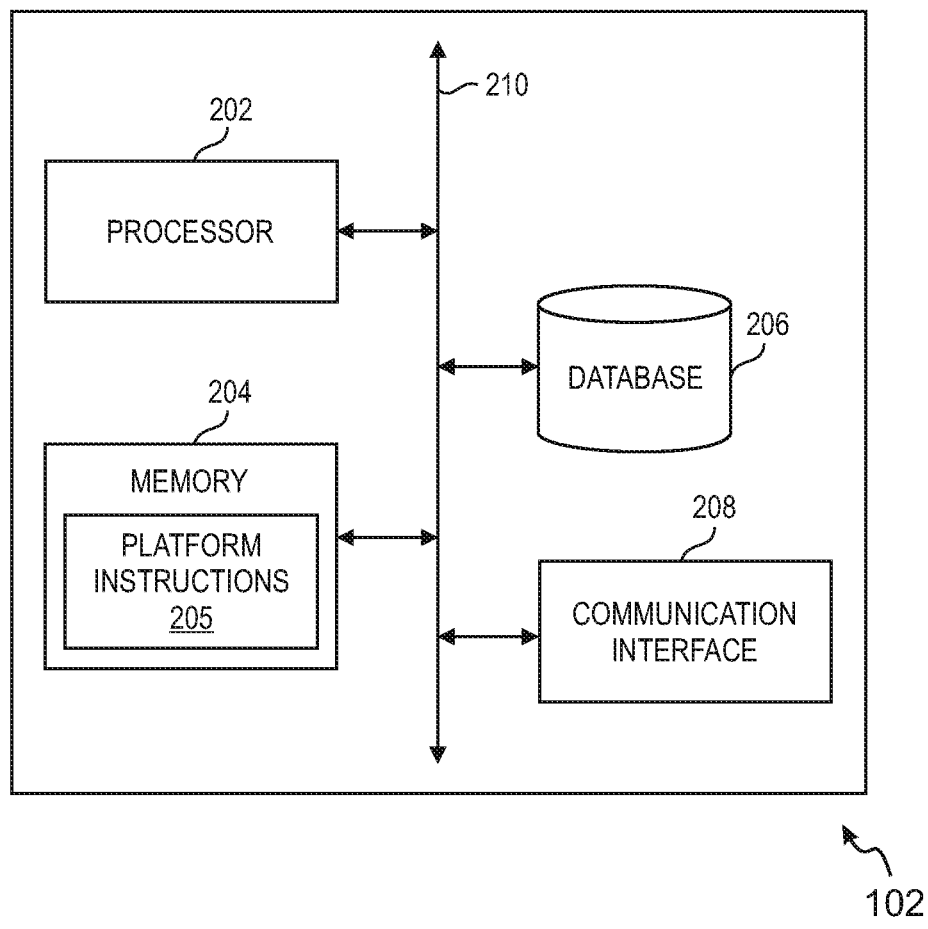
FIG. 2 is a block diagram showing various components of a server, in accordance with an example embodiment of the invention.

FIG. 2 is a block diagram showing various components of the server 102, in accordance with an example embodiment of the invention. The server 102 includes a processor 202, a memory 204, a database 206, and a communication interface 208. It is noted that although the server 102 is depicted to include only one processor, the server 102 may include more number of processors therein. In an embodiment, the memory 204 is capable of storing machine executable instructions, referred to herein as platform instructions 205. Further, the processor 202 is capable of executing the platform instructions 205. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.).

The memory 204 supports an installer for information projection application 114. The installer of the information projection application 114 may be downloaded from the server 102 into the PCD 104. The information projection application 114 downloaded into the PCD 104 may enable the user 112 to establish a user account within the server 102. Further, the information projection application 114 may enable the user 112 to provide the plurality of user preferences to the server 102 for storage. The user 112 configures user preferences via the information projection application 114.

The database 206 may be embodied as a non-volatile storage location capable of storing data such as data related to the user account, the plurality of user preferences and other such information. The processor 202 may access the stored data from the database 206 for determining the information to be provided to the user 112.

The server 102 may also include at least one communication interface such as the communication interface 208. The communication interface 208 may include communication circuitry such as for example, a transceiver circuitry including antenna and other communication media interfaces to connect to a wired and/or wireless communication network. The communication circuitry may, in at least some example embodiments, enable transmission of data signals and/or reception of signals to and/or from remote network entities, such as the plurality of projection devices 110a-n installed in the plurality of predefined locations of the indoor environment, as explained in reference to FIG. 1.

The various components of the server 102, such as the processor 202, the memory 204, the database 206 and the communication interface 208 may be configured to communicate with each other via or through a centralized circuit system 210. The centralized circuit system 210 may be various devices configured to, among other things, provide or enable communication between the components (202-208) of the server 102. In certain embodiments, the centralized circuit system 210 may be a central printed circuit board (PCB) such as a motherboard, a main board, a system board, or a logic board. The centralized circuit system 210 may also, or alternatively, include other printed circuit assemblies (PCAs) or communication channel media.

The provisioning of the information to the user 112 by the server 102 is hereinafter explained with reference to one user. It is noted that the server 102 may be caused to provision user defined location specific information for several users in a similar manner.

In at least one example embodiment, the user 112 may access the server 102, using the information projection application 114 installed in the PCD 104. In another example embodiment, the user 112 may access the information projection application 114 via a website hosted by the server 102. The user 112 may establish the user account with the server 102 using user information such as a name, email id, unique device identification of the PCD 104 and other such identification information. For security purpose, the user account may be associated with a password, a personal identification number (PIN), a security code or such authentication data shared with the user 112. Upon creating the user account, the user 112 may use the information projection application 114 to provide the plurality of user preferences to the server 102. In an example embodiment, the plurality of user preferences may be communicated to the server 102 via the PCD 104 over the first communication network 106. The plurality of user preferences may include a plurality of information to be provided to the user 112 based on a predefined criteria and a location of the user 112 in the indoor environment. The plurality of information may include information the user 112 seeks in a predefined location at a particular time and on a particular day. The user 112 may designate different information to be provided at different times for the predefined location. The user preferences include such designation, type of information needed, the time or occasion or trigger based on which the information is needed, and so on.

Further, the user 112 may provide access information related to third-party services such as e-mail, calendar, and social networks to the server 102. Further, the user 112 may provide a plurality of user settings on the third-party services. The access related information, user settings and the user preferences may be stored in the database 206.

The plurality of information may include and is not limited to a time-schedule of the user 112, a weather forecast, a traffic status on a route to a destination commuted by the user 112, stock market updates, emails, news updates, videos, smart-home service alerts, and social networking service notifications. For example, to provide social service notifications such as Facebook® posts, the server 102 may access a Facebook social networking account of the user 112 using the provided access information. In another example, to provide email notifications, the server 102 may access an email account of the user 112 using the access related information. Further, the predefined criteria may include a predetermined day of a year, and a predetermined time of a day. For example, a user preference may include weather forecast information, and email notifications to be provided to the user 112 at a time of 8.00 AM on all weekdays of a year in a bedroom location of a home environment of the user 112.

In another example embodiment, a user preference may include an activity to be performed when the user 112 navigates to a predefined location at a particular time of a day. For example, the server 102 may be configured to trigger an alarm in a bedroom to wake-up the user 112 at 8.00 AM on all weekdays of a year. In another example embodiment, the user preferences may relate to one or more services of one or more smart-home devices to be provided to the user at a predefined location. The server 102 may be configured to trigger the one or more smart-home services when the user 112 navigates to the predefined location as provided in the user preference. In an example embodiment, the information may be provided to the user 112 by a projection device 110a, when the server 102 is provided with the location of the user 112 by the projection device 110a. Tracking the location of the user 112 is described with reference to functioning of the plurality of projection devices 110a-n, as explained with reference to FIG. 3.

Figure 3:
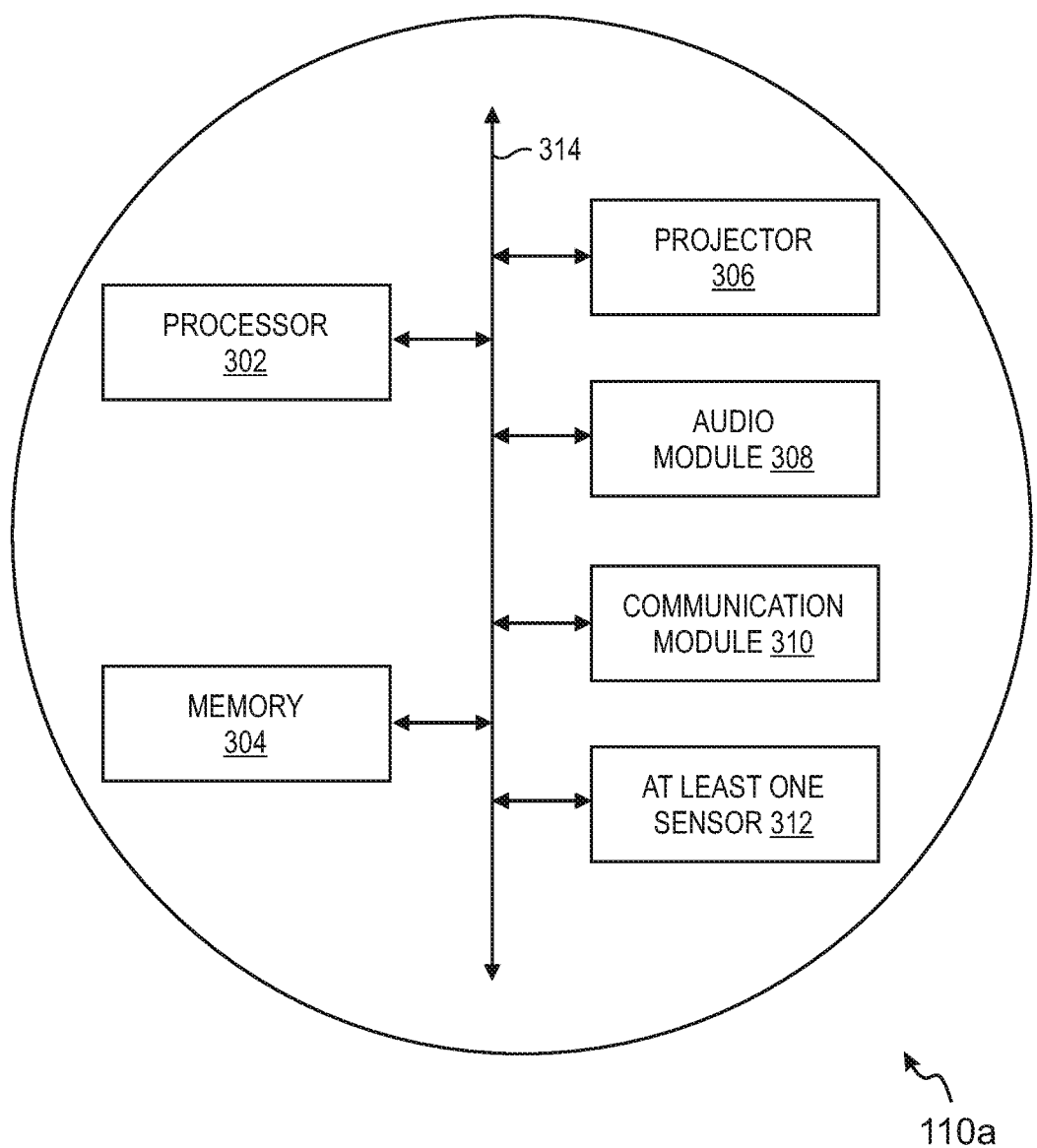
FIG. 3 is a block diagram showing various components of a projection device, in accordance with an embodiment of the invention.

FIG. 3 is a block diagram showing various components of the projection device 110a, in accordance with an embodiment of the invention. It may be noted that although explanation is given in reference to a single projection device 110a, similar explanation may apply to the plurality of projection devices 110b-n. On positioning the plurality of projection devices 110a-n in the plurality of predefined locations within the indoor environment, the PCD 104 is configured to establish a connection with each projection device 110a, 110b, 110c, to 110n using the second communication network 108. In an example embodiment, the second communication network 108 may be based on Bluetooth Low Energy (BLE) communication. Using the information projection application 114 installed in the PCD 104, the PCD 104 may initiate Bluetooth pairing or any other pairing, such as Wi-Fi pairing, with each projection device 110a, 110b, 110c to 110n, to make the each projection device 110a, 110b, 110c to 110n a part of the second communication network 108. Further, the PCD 104 may authorize each projection device 110a, 110b, 110c to 110n to communicate with the server 102 via the first communication network 106.

In order to track the location of the user 112, the plurality of projection devices 110a-n may communicate with the server 102 via the first communication network 106 and with the PCD 104 via the second communication network 108. As a result, when the user 112 enters into a predefined location associated with a projection device such as the projection device 110a, the projection device 110a may detect a presence of the user 112 using the second communication network 108, due to proximity of the PCD 104, and communicate the presence of the user 112 to the server 102 via the first communication network 106. Further, tracking of the user 112 may be explained with reference to the various components of the projection device 110a. The projection device 110a is depicted to include a processor 302, a memory 304, a projector 306, an audio module 308, a communication module 310 and at least one sensor 312. The various components of the projection device 110a are configured to communicate with each other via or through a centralized circuit system 314. The centralized circuit system 314 may include printed circuit assemblies (PCAs) or communication channel media.

The at least one sensor 312 is configured to sense an attribute in the predefined location associated with the projection device 110a. For example, if the projection device 110a is installed in a bedroom, the predefined location associated with the projection device 110a is the bedroom. In at least one example embodiment, sensing an attribute may include sensing a movement or a presence of the user 112 in the predefined location. For example the at least one sensor 312 may include a motion sensor to sense an attribute 'motion' in the predefined location. More specifically, the motion sensor may be configured to sense movement of the user 112 in the predefined location. Alternatively, the at least one sensor 312 may include a proximity sensor to detect a presence of the user 112. Further, a sensor from among the at least one sensor 312 may be a biometric sensor configured to recognize the user as the user 112. In another embodiment, camera and computer vision algorithms can be used to determine the user 112. Upon detecting the presence of the user 112 in the predefined location, the proximity sensor may communicate the detected presence of the user 112 to the communication module 310. The processor 302 communicably associated with the communication module 310 may receive the detected presence of the user 112 and may be configured to make one or more Application Programming Interface (API) calls to be communicated to the server 102 by the communication module 310 via the first communication network 106. An API call may include a request for the information to be provided to the user 112 in the predefined location.

The one or more API calls may be received by the communication interface 208 of the server 102, and may be communicated to the processor 202. The processor 202 may analyze the one or more API calls and determine the information to be provided to the user 112 upon accessing the stored plurality of user preferences in the database 206. The information may be communicated by the communication interface 208 to the projection device 110a that detected the presence of the user 112 in the predefined location.

Upon receiving the information, the projection device 110a, may communicate the information to the user 112 by displaying the information on a view space to the user 112 in the predefined location. The processor 302 may cause the projector 306 to project or display the information on the view space for the user 112. In an example embodiment, a gyroscope or a position sensor may detect a position of the projection device 110, and based on an orientation of the projection device 110a with respect to a convenient space for projecting the information, the server 102 or the projecting device 110a may rotate the projection or perspective by a required correction angle, so that an unobstructed projection is achieved. Exemplary perspective views of the projection device 110a are depicted in FIG. 4 and FIGS. 8A-8G. In some embodiments, the projection device 110a may itself move its components to project the information correctly.

In an embodiment, the at least one sensor 312 may include sensors like temperature sensor for sensing temperature around the projection device 110a and alerting the server 102 of the sensed temperature. The server 102 may then cause an adjustment of the temperature to a preferred user setting. Similarly, the at least one sensor 312 may include a lighting sensor for sensing lighting conditions around the projection device 110a and alert the server 102. The server 102 then may cause an adjustment of the lighting conditions as per user's preferred settings.

Figure 4:
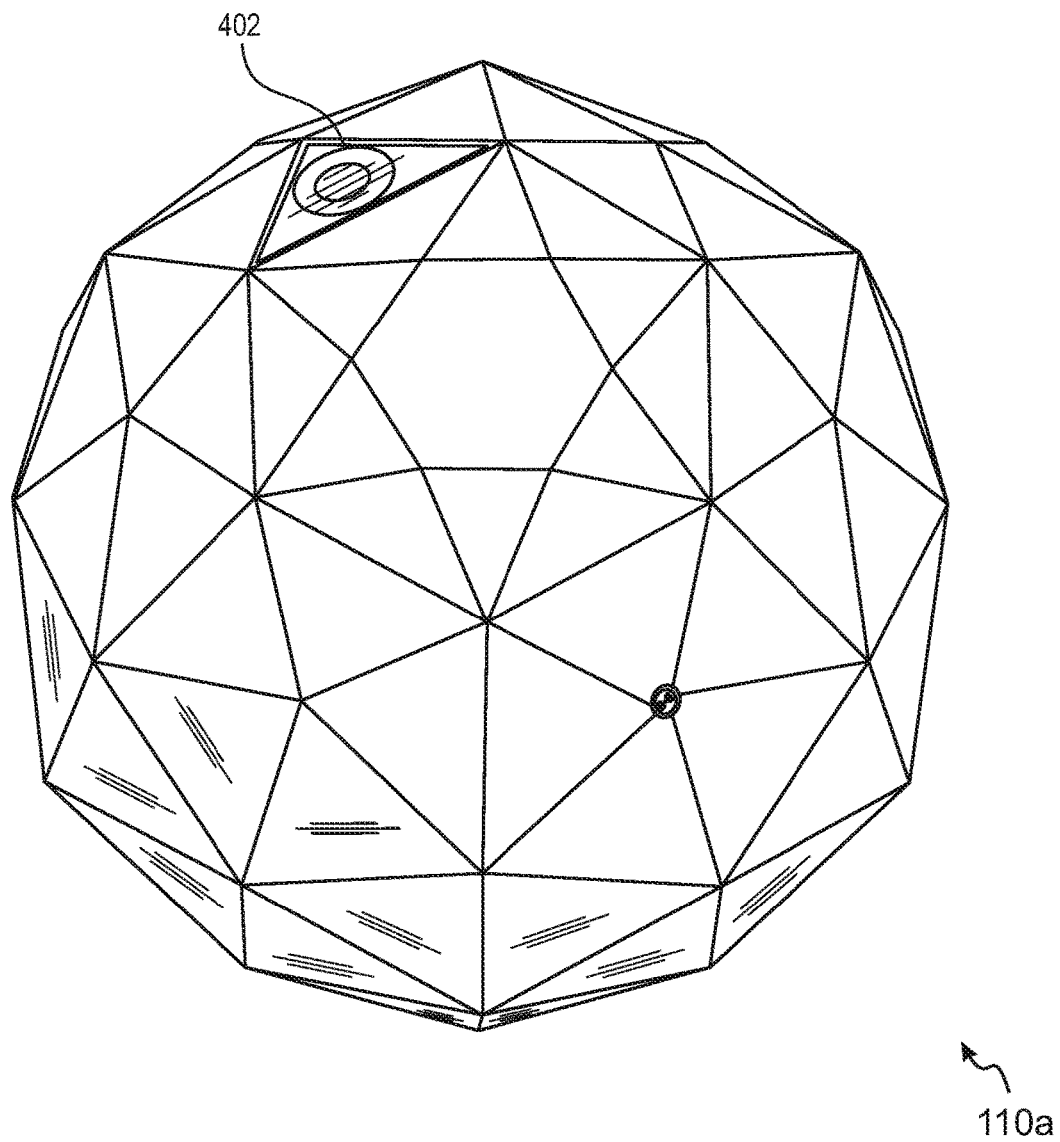
FIG. 4 shows a perspective view of a projection device, in accordance with an example embodiment of the invention.

FIG. 4 illustrates a perspective view of the projection device 110a of the system 100, in accordance with an example embodiment of the invention. It may be noted that although FIG. 4 depicts the perspective view of the projection device 110a, a similar perspective view applies to projection devices 110b-n. As shown, an exterior of the projection device 110a is almost spherical in shape, thereby enabling an easy rotation of the projection device 110a by the gyroscope sensor. Further, an aperture 402, on the exterior of the projection device 110a may be made of a transparent material such as glass or silica for permitting transmission of the displayed information when emitted by an optical engine of the projector 306. In an example embodiment, the display or projection of the information may occur on a wall of the predefined location. An illustration depicting the projection of the information by the projection device 110a in an indoor environment is explained in reference to FIG. 5.

FIGS. 8A-8G show a plurality of views, such as a top view, a side view, lateral views, different perspective views etc. of the projection device, in accordance with an example embodiment of the invention. The different views show location of at least one of the aperture 402, camera and gesture detecting sensor.

Figure 5:
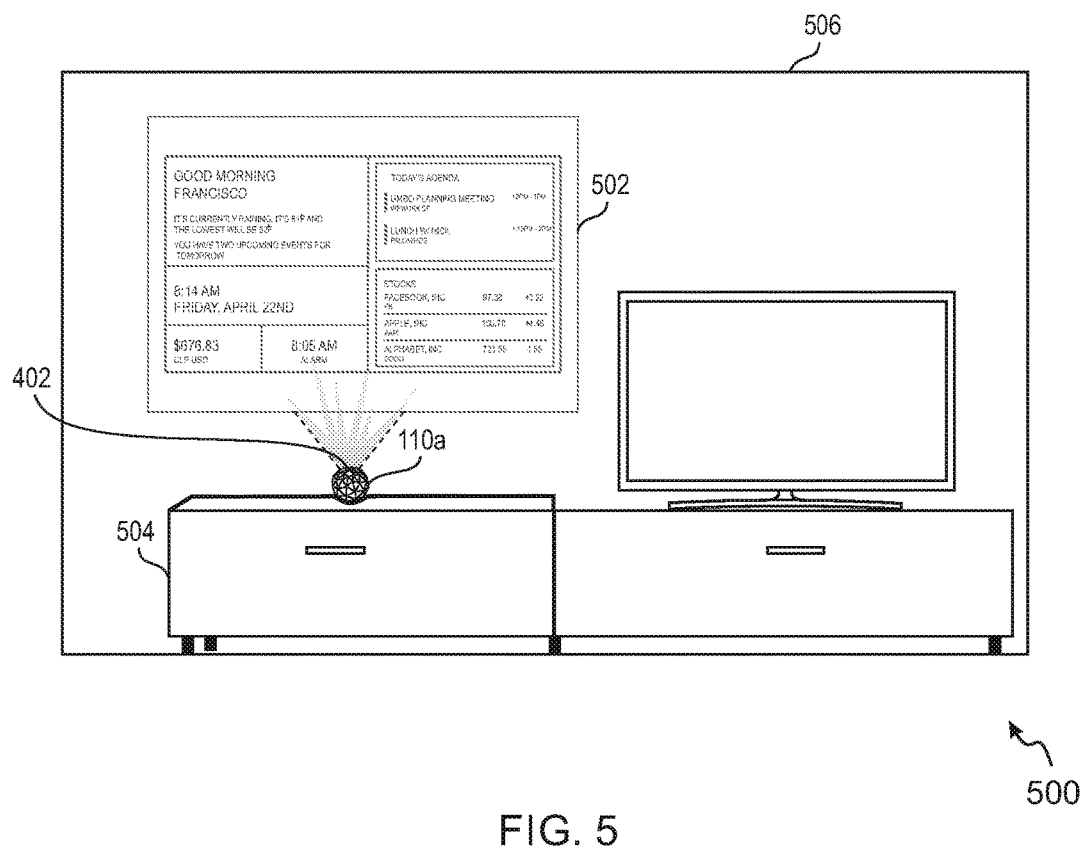
FIG. 5 is an example indoor environment depicting a projection of information, in accordance with an example embodiment of the invention.

FIG. 5 is an example indoor environment 500 depicting the projection of the information by the projection device 110a, in accordance with an example embodiment of the invention. The indoor environment 500 is depicted to be a living room including a cabinet 504 affixed near a wall 506. The projection device 110a may be placed on top of the cabinet 504 near the wall 506, and may be rotated at an angle such that the aperture 402 points towards the wall 506. On being positioned, the projection device 110a may display information 502 on the wall 506 as shown, unobstructed by any object. It will be appreciated that an example setting is indicated herein and the setting can vary in different embodiments, for example placing on a wall to display on the ceiling etc.

In an example embodiment, the projection device 110a includes an inbuilt capability to provide automatic corrections so that the display is easily and clearly viewed by the user 112 without distortion regardless of how close or far from the wall 506 the projection device 110a is positioned. In another example embodiment, the display of the information may be provided on a ceiling of the indoor environment 500. A detailed overview of the displayed information 502 is explained with reference to FIG. 6.

Figure 6:
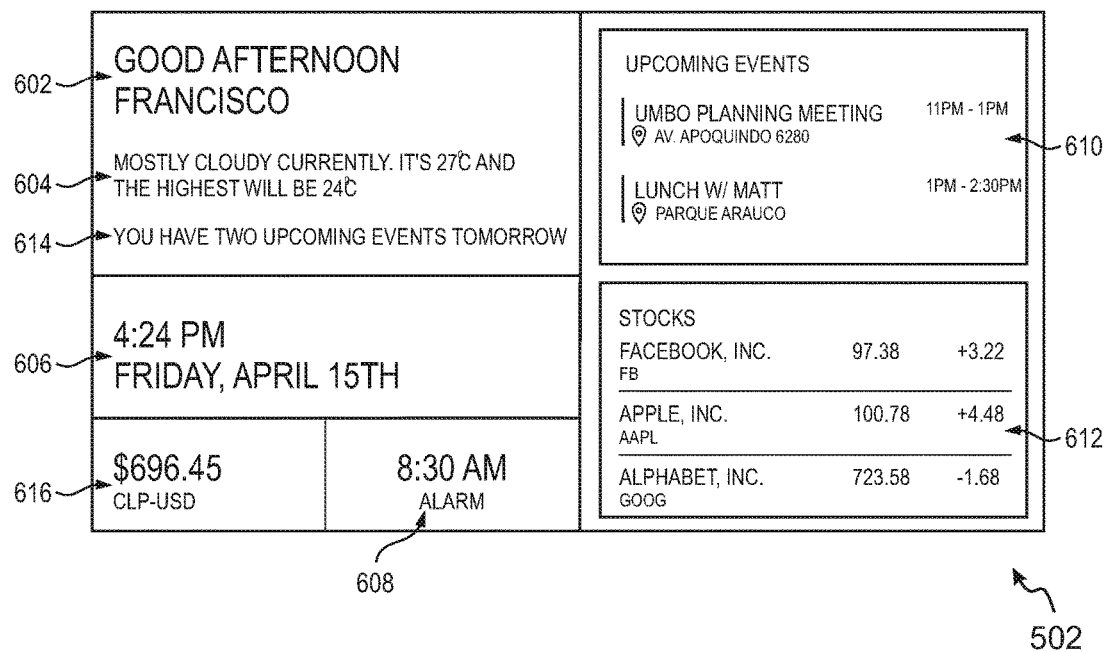
FIG. 6 illustrates an example display of the information to the user, in accordance with an example embodiment of the invention.

FIG. 6 illustrates various components of the displayed information 502, hereinafter referred to as "display" 502, in accordance with an example embodiment. A layout of the various components or widgets of the display 502 may be configured by the user 112 by providing an input regarding said layout to the server 102 as one or more user preferences. For example, a layout may include four widgets on a single window, an email notification on another window and agenda and traffic condition updates on yet another window. As shown a layout of the display 502 is configured to include a plurality of components, such as, a welcome message 602 indicating "Good Afternoon Francisco", a weather forecast update 604 indicating "Mostly Cloudy. Currently it's 27 degree C. and the highest will be 24 degree C.", a time and date information 606 indicating a current time and date "4.24 PM, Friday, April 15th", a preferred stock update 616 indicating a current level of a preferred stock, as shown "S696.45 CLP-USD", an alarm 608 indicating an alarm set for a day "8.30 AM", a work update 614 indicating "You have two upcoming events tomorrow", details of the work updates 610 and an opening price of a set of stocks 612. Aforesaid display 502 may enable the user 112 to view the plurality of information in a clear unobstructive manner. In an example embodiment, the at least one sensor 312 may include an ambient lighting sensor that senses an illumination level of the predefined location. Based on the sensed level of illumination, the processor 302 may regulate an output of the optical engine of the projector 306 for adjusting a brightness level of the display 502. For example, if the sensed illumination of the predefined location is of a low light intensity, the brightness level of the display 502 may be adjusted to a higher intensity of illumination to enable the user 112 to view the display 502 clearly.

In an example embodiment, the communication module 310 may receive an input from the user 112 indicating a portion of the display 502 to be viewed by the user 112. The input may include a gesture command, a voice command, or a haptic feedback. For example, if the input includes a swipe of a hand, indicating the user 112 intends to navigate to a particular window of the display 502, the motion sensor of the at least one sensor 312 may detect the input. In addition, there may be other gesture detecting sensors for detecting user input to navigate views. Further, the processor 302 may process the received input to retrieve the portion of the information to be viewed from the information to be provided to the user 112. Further, the communication module 310 may communicate the portion of the information to the user 112. For example, the projector 306 may be configured to display the opening price of a set of stocks 612 in a magnified view when the user 112 makes a double tap hand gesture in a direction of 612 on the display 502. In another example embodiment, the user 112 may provide a voice input indicating the portion of the information to be viewed. The projection device 110a may include an audio codec configured to process the voice input and other sounds. On processing the voice input and other sounds, the portion of the information requested in the voice command may be provided to the user 112. In an example embodiment, the information may be provided to the user 112 by the audio module 308, in an audio format. The audio module 308 may include speakers to output sounds, music, alerts and other feedback pertaining to the information to be provided to the user 112.

In an example embodiment, the processor 302 may be configured to deactivate the projection device 110a when the motion sensor senses a movement indicating an exit of the user 112 from the predefined location. Accordingly, the processor 302 may activate the projection device 110a when the motion sensor senses a movement indicating an entry of the user 112 into the predefined location. For example, when the user 112 enters a bedroom, a projection device installed in the bedroom may detect an entry of the user 112 into the bedroom and may get activated, thereby displaying the information to be provided to the user 112 in the bedroom. Further, when the user 112 exits the bedroom and enters the kitchen, the projection device in the bedroom may turn off upon detecting the exit of the user 112 from the bedroom, and a projection device in the kitchen may turn on upon detecting an entry movement of the user 112 into the kitchen. Upon activation, the projection device of the kitchen may display information to be provided to the user 112 in the kitchen, based on the stored one or more user preferences associated with the kitchen location.

Further, the user 112 may manually trigger the plurality of projector devices 110a-n by communicating an input using the PCD 104. The input may include a request for the information. Upon receiving the input from the PCD 104, the projector device 110a, may retrieve the information from the server 102 as described with reference to FIG. 3. The retrieved information may be provided to the user 112 as explained with reference to FIGS. 5 and 6.

In an example embodiment, the projection device 110*a* may be configured to trigger one or more smart-home devices based on the plurality of user preferences upon detecting the presence of the user 112 in the predefined location. The plurality of user preferences may relate to one or more services of the one or more smart-home devices preferred by the user 112 in the predefined location. For example, a temperature sensor of the at least one sensor 312 of the projection device 110*a* may detect a temperature level in the predefined location. If the user preference retrieved from the server 102, indicates a preference of the user 112 of having a lower temperature than the detected temperature, the processor 302 may be configured to send an API call to a smart home device such as a Nest thermostat to alter the temperature level of the predefined location to the lower temperature.

Further, the at least one sensor 312 may detect one or more routines of the user 112 and provide the detected routines to the processor 302. The processor 302 may record the one or more routines and communicate the one or more routines to the server 102. Further, the server 102, may adjust one or more of the stored plurality of user preferences based on the received one or more routines. For example, the one or more routines may include a waking and sleeping time of the user 112, determined by the presence of the user 112 in the bedroom recorded at specified times over a plurality of days. In another example, an eating routine of the user 112 may be determined by recording the presence of the user 112 in the dining area recorded at specified times over a plurality of days. Furthermore, a working schedule of the user 112 may be determined by recording an exit and entry of the user 112 in a specified work over a plurality of days. Upon adjusting the one or more of the stored plurality of user preferences, the server 102 may provide the information to the user 112 based on the adjusted one or more user preferences. Further, the server 102 may enable the user 112 to update the stored plurality of user preferences by using the information projection application 114 installed on the PCD 104. Alternatively, the user 112 may manually update one or more user preferences by logging into the server 112, and saving the updated one or more user preferences to the database 206.

In an example, embodiment, if the user 112 moves to a location not covered by the plurality of predefined locations, the server 102 may communicate the information to be provided to the PCD 104. For example, if the user 112 is travelling, and is external to the indoor environment 500, the server 112 may be configured to provide the weather forecast and traffic update related information directly to the PCD 104. A method for facilitating projection of user defined location specific information is explained with reference to FIG. 7.

Figure 7:
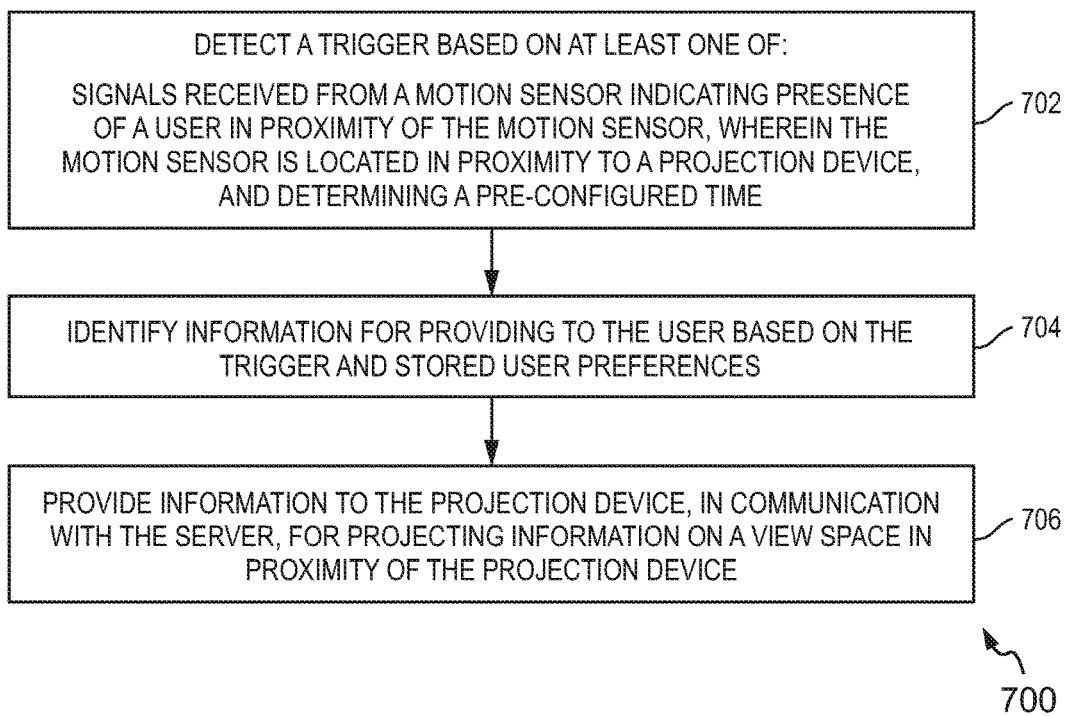
FIG. 7 is a flowchart illustrating a method for providing information to a user, in accordance with an example embodiment of the invention.
Figure 8A:
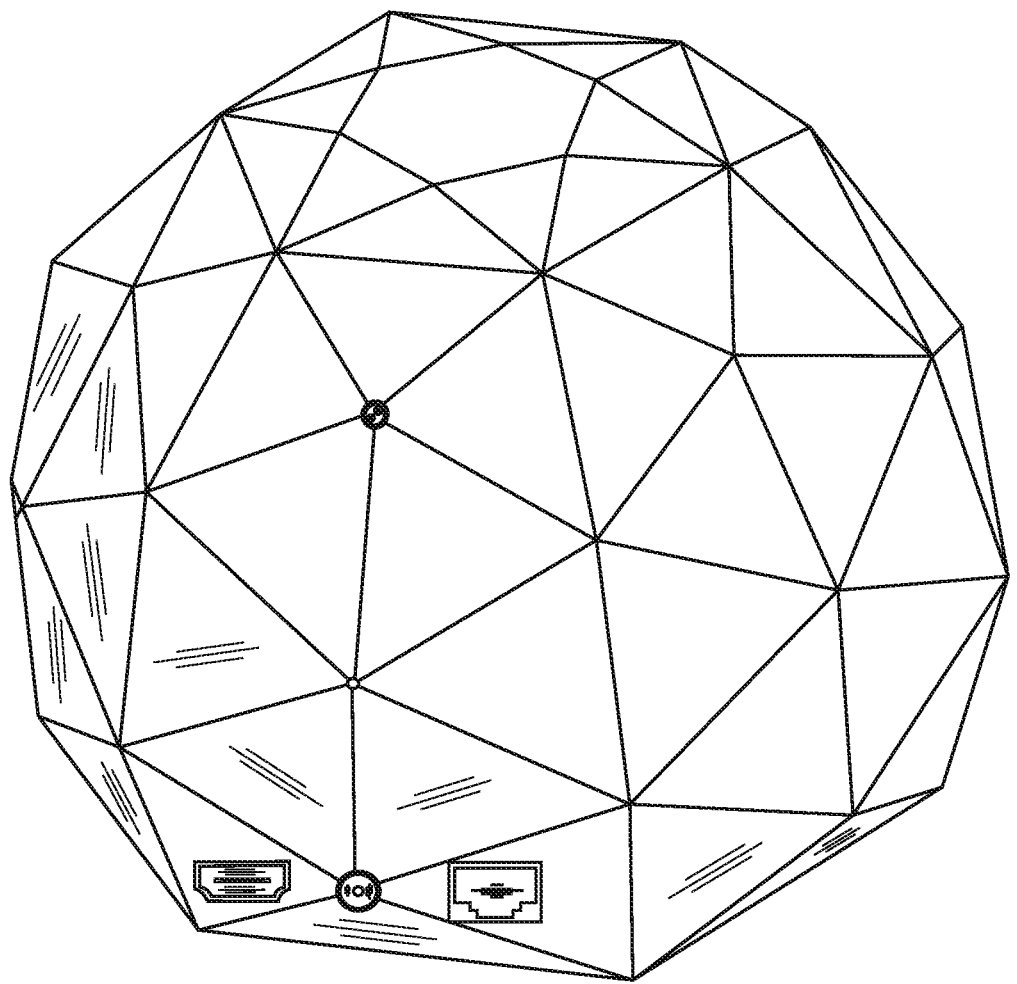
FIGS. 8A-8G show a plurality of views of the projection device, in accordance with an example embodiment of the invention.
Figure 8B:
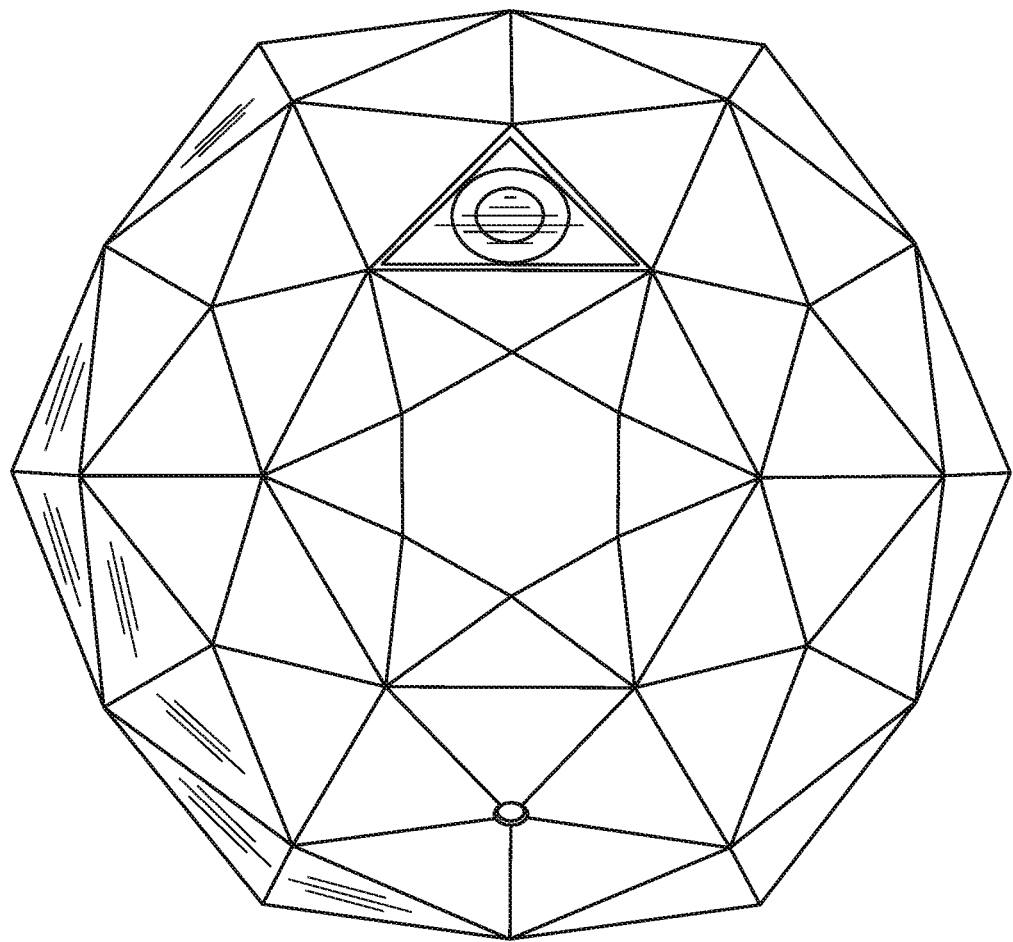
Figure 8C:
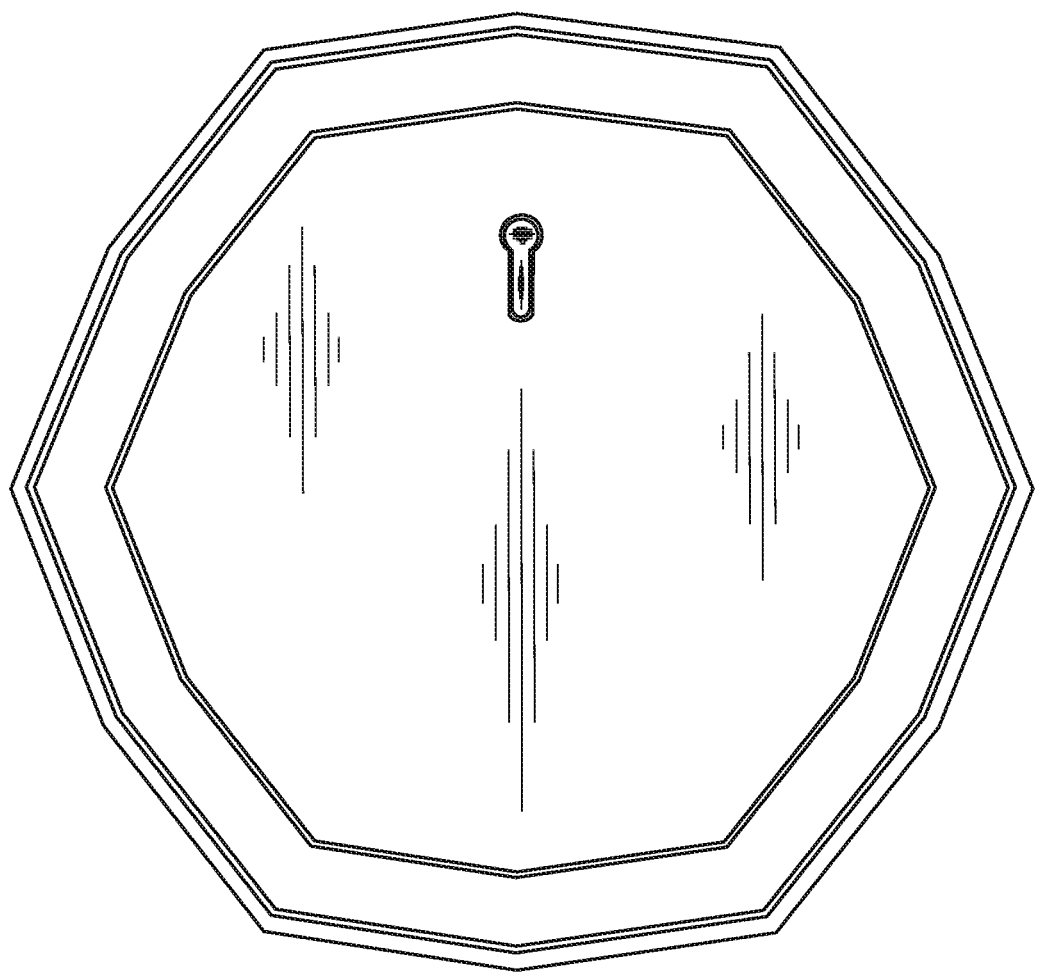
Figure 8D:
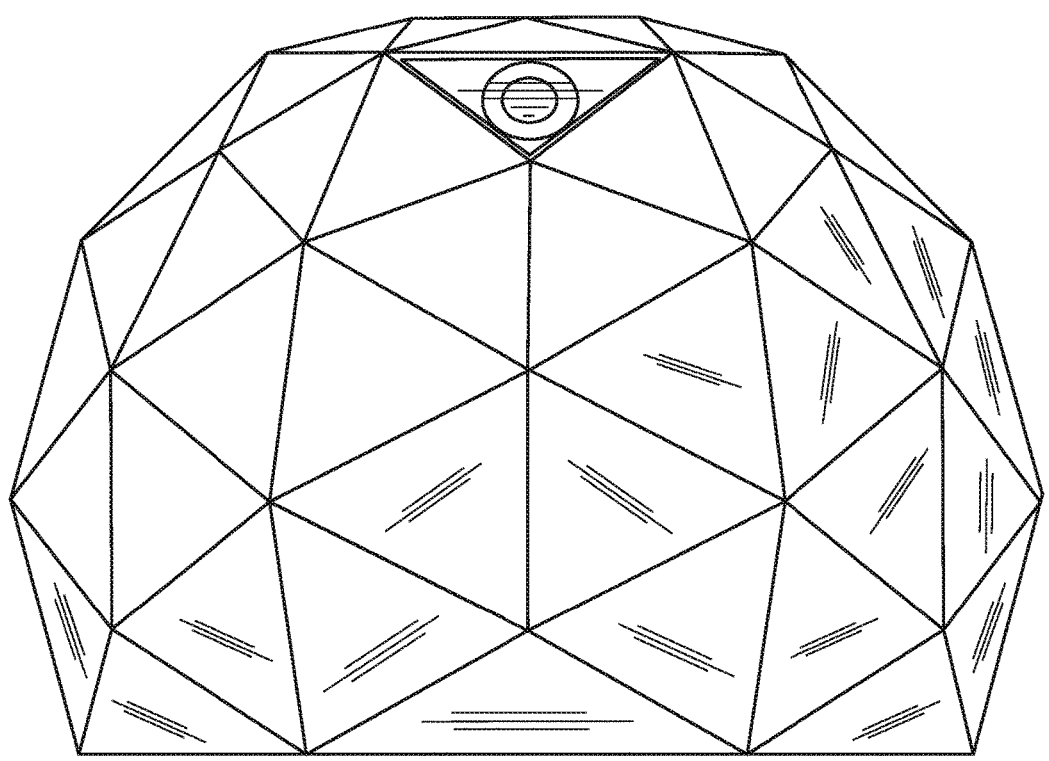
Figure 8E:
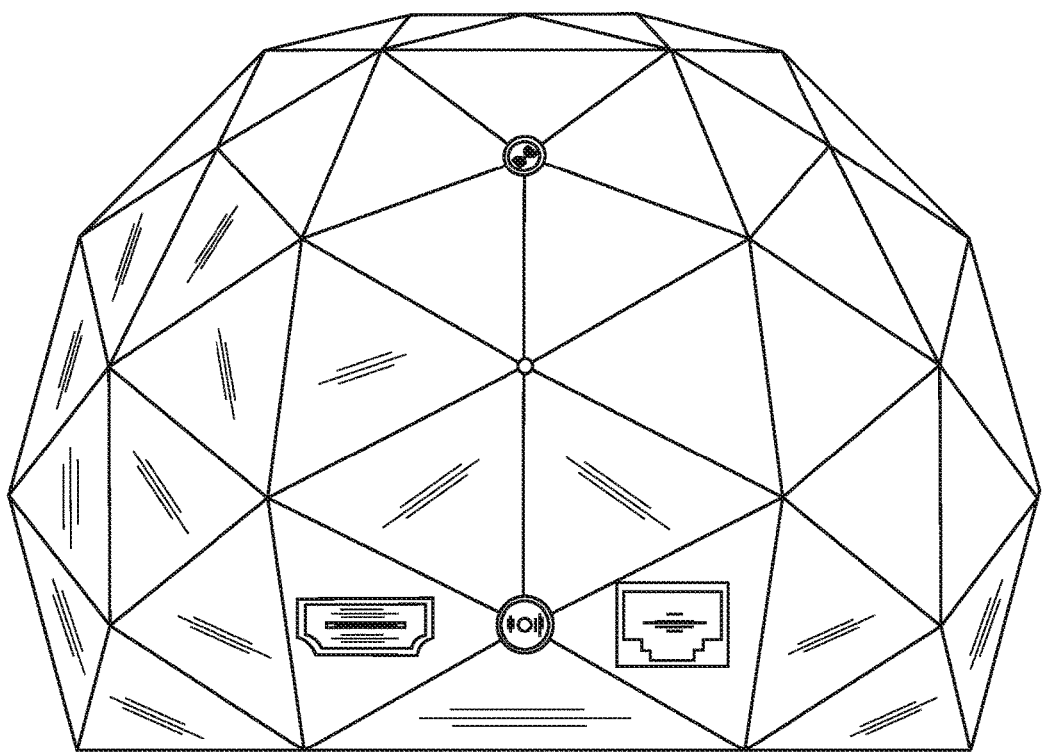
Figure 8F:
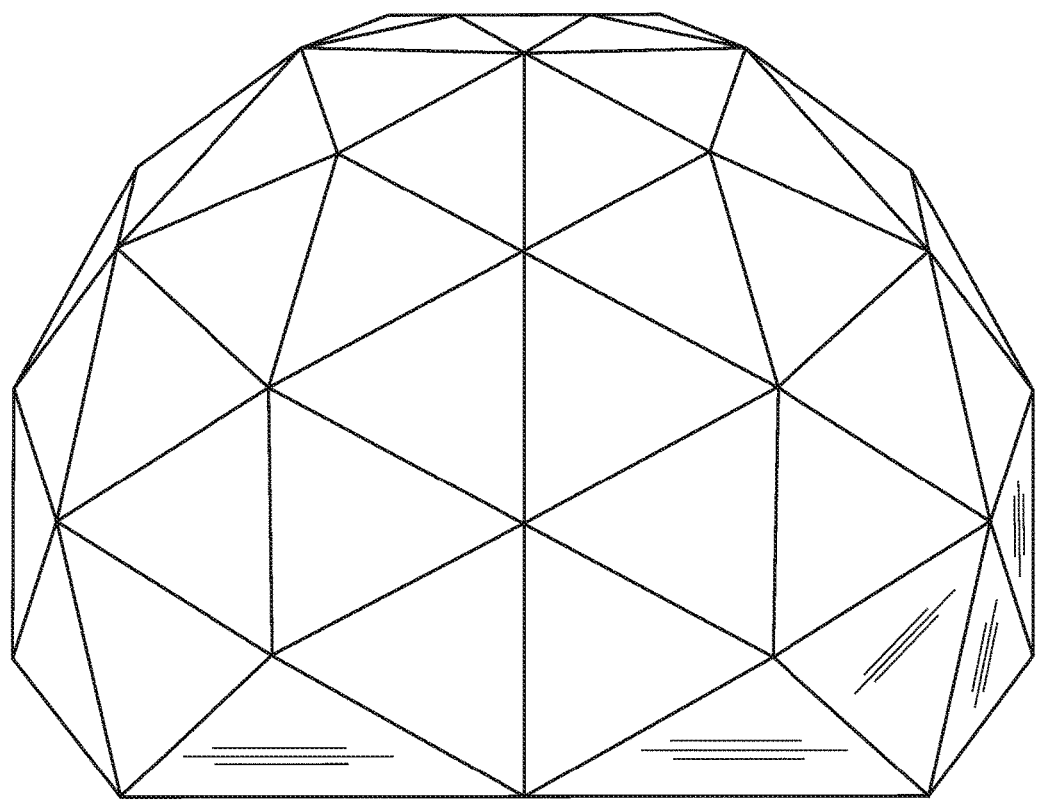
Figure 8G:
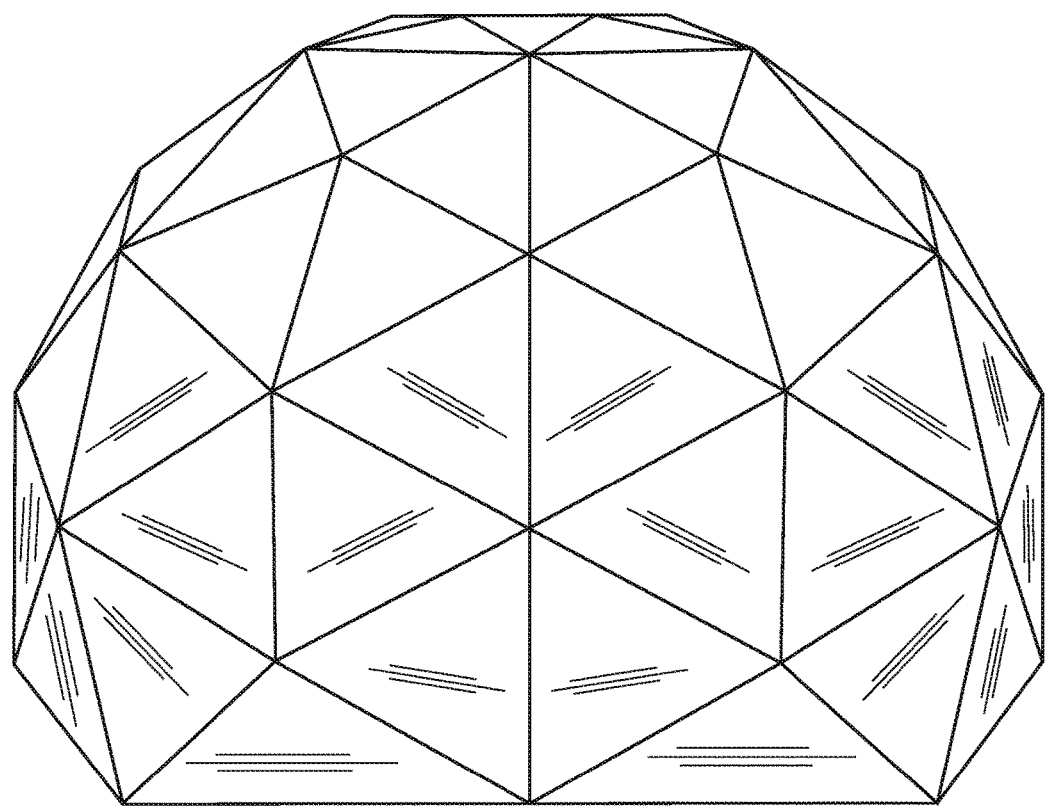

FIG. 7 is a flow diagram of an example method 700 for providing information to the user, such as the user 112, in accordance with an embodiment of the invention.

The method 700 depicted in the flow diagram may be executed by the server 102 or the projection system or by the projection device 110A or a combination thereof.

Operations of the flowchart, and combinations of operation in the flowchart, may be implemented by, for example, hardware, firmware, a processor, circuitry and/or a different device associated with the execution of software that includes one or more computer program instructions. The operations of the method 700 are described herein with help of the projection device 110*a*.

The method 700 starts at operation 702.

At operation 702, a trigger is detected using at least one of signals received from a motion sensor indicating presence of the user within proximity of the motion sensor, wherein the motion sensor is located in proximity to a projection device, and determining a preconfigured time. The preconfigured time is configured by the user to meet the user preferences and desires. The motion is detected by processing the signals and detecting movement in proximity to the projection device.

At operation 704, information for providing to the user is identified based on the trigger and stored used preferences. The user preferences may be stored in form of a table with various mappings indicating what information the user prefers at a particular time, how user wants the information to be displayed, from where user wants the information to be retrieved, and so on. The information is fetched based on the user preferences upon detecting the trigger.

At operation 706, the information is provided to the user by displaying the information on a view space in the predefined location. A projector communicably associated with the projection device may be caused to display the information. For example, if the user is in a bedroom, the information may be displayed on a wall or a ceiling of the bedroom unobstructed by any objects or things. In an example embodiment, an ambient lighting sensor from the at least one sensor may sense an illumination level of the predefined location, and provide the sensed illumination to the processor. The processor may regulate an output of the projector such that a brightness level of the displayed information may be adjusted to a level that may enable the user to view the displayed information clearly.

In one example, the method 700 includes determining position of the projection device using a position sensor, and correcting perspective of the information for appropriate display on the view space. The view space can also be predefined by the user.

In another example, the method 700 includes determining lighting conditions in proximity to the projection device using a light sensor, and adjusting lighting of display of the information based on the determined lighting conditions.

In yet another example, the method 700 includes tracking user inputs indicating modifications regarding the information, and updating the stored user preferences based on the tracking.

In various embodiments, the information or the user preferences or both includes at least one of a time-schedule of the user, a weather forecast, a traffic status on a route to a destination commuted by the user, stock market updates, emails, news updates, videos, smart-home service alerts, and social networking service notifications.

The method 700 further causes the projection device to enter into an idle state based on at least one of: (1) when the user leaves the proximity of the projection device, and (2) when no motion is sensed by the motion sensor for a predefined time period (for example, a 10 minute time period, an hour, or any such predefined time period).

In an example embodiment, the user may communicate with the projection device, by providing an input indicating a portion of the information to be viewed by the user. The input may be a gesture command, a voice command or a haptic feedback. Upon receiving the input, the processor may process the input and retrieve the portion of the information to be viewed from the information to be provided to the user. The communication module may communicate the portion of information to the user. For example, the user may navigate a plurality of windows of the displayed information by providing a gesture involving a swipe of a hand.

In an example embodiment, the user may manually trigger the projection device to provide information. For example, the projection device may receive an input from the user via the PCD, the input including a request for the information. The projection device may retrieve the information from the server based on the received input, and communicate the retrieved information to the user.

The disclosed method 700 or one or more operations of the method 700 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Various example embodiments offer, among other benefits, techniques for efficient provisioning of user defined location specific information. The methods and systems disclosed herein enable the projection of relevant information in real-time based on a current location and preference of the user. The disclosed systems may be adapted for use in a larger environment such as a hotel, a hospital, an educational institute and the like, thereby providing the user an interactive environment enriched with information desired by the user. Displaying the information to the user saves considerable time on behalf of the user in searching for the relevant information, and reduces a cognitive burden on the user of having to memorize availability of various information sources.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server 102, the plurality of projection devices 110a-n, and the PCD 104 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations (for example, operations explained herein with reference to FIG. 7). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for providing information to a user, the method comprising:
    detecting, by a server, a trigger based on:
        signals received from a motion sensor indicating presence of the user within proximity of the motion sensor, wherein the motion sensor is located in proximity to a projection device, the projection device located remotely to the server;

determining, by the server, a preconfigured time;

identifying, by the server, the information for providing to the user based on the trigger and stored user preferences, the stored user preferences comprising the information the user prefers at a particular time and from where user wants the information to be retrieved, and arrangement of a plurality of widgets for display, wherein the arrangement is configurable by the user;

providing, by the server, the information to the projection device in communication with the server for projecting the information on a view space in proximity to the projection device, determining position of the projection device using a position sensor; and correcting perspective of the information by a required correction angle and also based on a distance of the projection device from a surface of the view space for appropriate display on the view space, wherein the projection device is spherical in shape and the perspective correction is achieved by rotating the projection device using the position sensor; and wherein the projection device is made of silica that permits transmission of the information for display when emitted by an optical engine of the projection device.

2. The method as claimed in claim 1, further comprising:

determining lighting conditions in proximity to the projection device using a light sensor; and adjusting lighting of the display of the information by regulating output of an optical engine of the projection device based on the determined lighting conditions, wherein the adjustment comprises increasing intensity of illumination of the information if the determined lighting conditions comprise low intensity.

3. The method as claimed in claim 1, further comprising:

tracking user inputs indicating modifications regarding the information; and updating the stored user preferences based on the tracking.

4. The method as claimed in claim 1, wherein the information comprises at least one of a time-schedule of the user, a weather forecast, a traffic status on a route to a destination commuted by the user, stock market updates, emails, news updates, videos, smart-home service alerts, and social networking service notifications.

5. The method as claimed in claim 1, further comprising:

causing the projection device to enter into an idle state when the user leaves the proximity of the projection device, and when no motion is sensed by the motion sensor for a predefined time period.

6. The method as claimed in claim 1 and further comprising:

triggering one or more smart-home devices based on the user preferences upon detecting the presence of the user, wherein the user preferences relate to one or more services of the one or more smart-home devices.

7. The method as claimed in claim 6 and further comprising: detecting temperature around the projection device;

determining that temperature in the user preferences is lower than the detected temperature; and sending an application program interface (API) call to the one or more smart-home devices to alter the temperature around the proximity device until the temperature in the user preferences is not lower than the detected temperature.

8. A projection system comprising: a motion sensor;

a biometric sensor;

a processor configured to:

receive signals from the motion sensor and the biometric sensor;

detect presence of a user in proximity to the motion sensor using the signals from the motion sensor and the biometric sensor; and identify information for providing to the user based on stored user preferences, the stored user preferences comprising the information the user prefers at a particular time and from where user wants the information to be retrieved, and arrangement of a plurality of widgets for display, wherein the arrangement is configurable by the user; and a projection device configured to: receive the information, and project the information on a view space in proximity to the projection device, and a position sensor causing determination of a position of the projection device, wherein the processor corrects perspective of the information by a required correction angle and also based on distance of the projection device from surface of the view space for appropriate display on the view space;

wherein the projection device is spherical in shape and the perspective correction is achieved by rotating spherical projection device using the position sensor; and wherein the projection device is made of silica that permits transmission of the information for display when emitted by an optical engine of the projection device.

9. The projection system as claimed in claim 8, wherein the motion sensor, the biometric sensor and the projection device are part of a single device and the processor is a separate device in communication with the single device, and wherein the single device makes an application programming interface (API) call to the separate device to obtain the information.

10. The projection system as claimed in claim 9, further comprising:

a plurality of single devices, wherein the plurality of single devices communicate with the processor using a first communication network and the plurality of single devices communicate with each other using a second communication network.

11. The projection system as claimed in claim 8, further comprising:

a lighting sensor causing determination of lighting conditions in proximity to the projection device, wherein the processor adjusts lighting of display of the information by regulating output of an optical engine of the projection device based on the determined lighting conditions, wherein the adjustment comprises increasing intensity of illumination of the information if the determined lighting conditions comprise low intensity.

12. The projection system as claimed in claim 8, further comprising:

a temperature sensor that senses temperature around the projection device, wherein the processor causes adjustment of temperature based on user setting.

13. The projection system as claimed in claim 8, wherein the processor tracks user inputs indicating modifications regarding the information, and updates the stored user preferences based on tracking.

14. The projection system as claimed in claim 8, further comprising:
a haptic device that enables interaction between the user and the projection device, wherein the interaction comprises navigation.

15. The projection system as claimed in claim 8, wherein the information comprises a time-schedule of the user, a weather forecast, a traffic status on a route to a destination commuted by the user, stock market updates, emails, news updates, videos, smart-home service alerts, and social networking service notifications.

16. A system comprising:
a processor; and
a memory coupled to the processor, the memory storing instructions which when executed by the processor cause the system to perform a method for providing information to a user, the method comprising:
detecting a trigger based on signals received from a motion sensor indicating presence of the user within proximity of the motion sensor, wherein the motion sensor is located in proximity to a projection device;
determining a preconfigured time;
identifying the information for providing to the user based on the trigger and stored user preferences, the stored user preferences comprising the information the user prefers at a particular time and from where user wants the information to be retrieved, and arrangement of a plurality of widgets for display, wherein the arrangement is configurable by the user;
providing the information to the projection device in communication with the processor for projecting the information on a view space present in proximity to the projection device, and
a gyroscope causing determination of a position of the projection device, wherein the projection device moves its components to project the information correctly, wherein the processor corrects perspective of the information by a required correction angle and also based on distance of the projection device from surface of the view space for appropriate display on the view space, wherein the projection device is spherical in shape and the perspective correction is achieved by rotating spherical projection device using the gyroscope; and
wherein the projection device is made of a transparent material comprising glass or silica that permits transmission of the information for display when emitted by an optical engine of the projection device.

17. The method as claimed in claim 1 and further comprising:
tracking presence of the user in a particular area for a specified time over a plurality of days;
determining a routine based on the tracking;
adjusting the stored user preferences to incorporate the routine; and
identifying information for display based on adjusted user preferences.

* * * * *